United States Patent [19]

Crowley

[11] Patent Number: 5,108,144
[45] Date of Patent: Apr. 28, 1992

[54] RECREATIONAL VEHICLE WITH TWO RIGIDLY COUPLED SECTIONS

[76] Inventor: Michael J. Crowley, 114 Chadd Rd., Newark, Del. 19711

[21] Appl. No.: 559,682

[22] Filed: Jul. 30, 1990

[51] Int. Cl.⁵ .............................................. B60P 3/345
[52] U.S. Cl. ...................................... 296/165; 296/26; 296/166; 296/167; 296/168; 296/176
[58] Field of Search ............... 296/156, 164, 166, 26, 296/165, 167, 168, 172, 176

[56] References Cited

U.S. PATENT DOCUMENTS

| | | | |
|---|---|---|---|
| 2,256,038 | 9/1941 | Woodruff | 280/789 |
| 2,345,945 | 4/1944 | Miner | 280/64 |
| 3,208,768 | 9/1965 | Hulbert | 280/408 |
| 3,314,692 | 4/1967 | Karns | 296/156 X |
| 3,387,859 | 6/1968 | McClellan | 280/204 |
| 3,547,480 | 12/1970 | Ward | 296/164 |
| 3,719,244 | 3/1973 | Miller et al. | 296/164 X |
| 3,917,316 | 11/1975 | Furnish | 280/460.1 |
| 4,078,821 | 3/1978 | Kitterman | 280/460.1 |
| 4,239,253 | 12/1980 | Golze | 280/460.1 |
| 4,372,569 | 2/1983 | Otterson | 280/78 |
| 4,557,518 | 12/1985 | Maclean et al. | 296/156 |
| 4,848,831 | 7/1989 | Buday | 296/165 |

Primary Examiner—Dennis H. Pedder
Assistant Examiner—Andrew C. Pike

[57] ABSTRACT

A recreational vehicle comprised of a front section is rigidly coupled to a rear section. This design allows the vehicle to be utilized similar to a motor home when coupled and yet uncoupled when desired. Four independent suspension and wheel assemblies support the trailer. Each of the four suspension pivot about an upright axis. The pivoting action of the suspension allows the front and rear sections to be rigidly coupled.

1 Claim, 2 Drawing Sheets

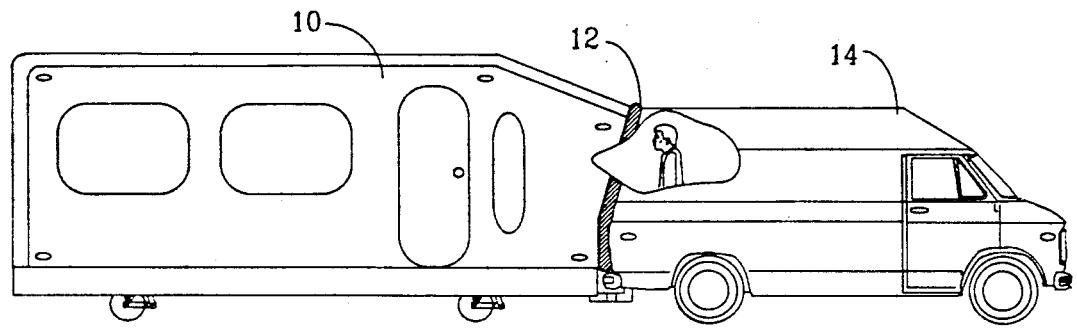
FIGURE 1
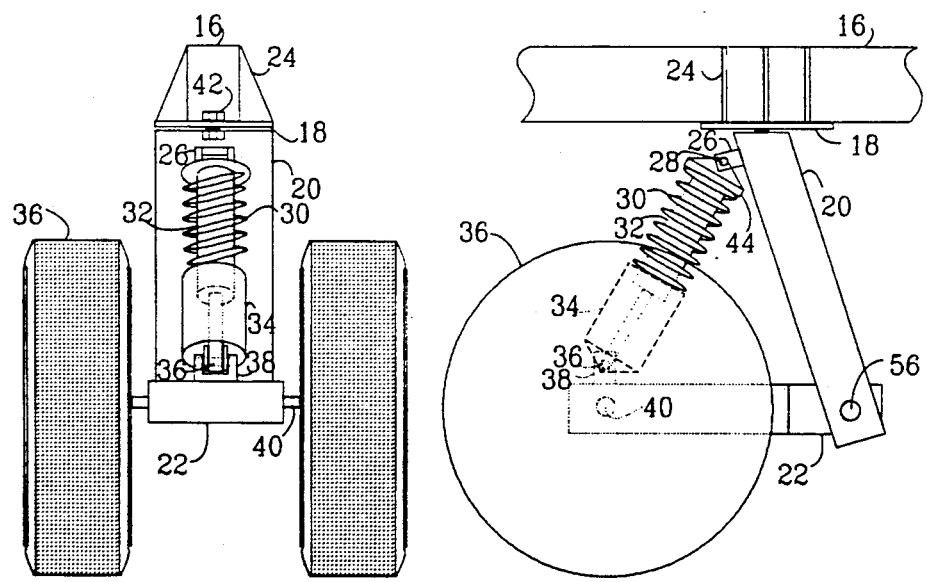
FIGURE 2
FIGURE 3

RECREATIONAL VEHICLE WITH TWO RIGIDLY COUPLED SECTIONS

BACKGROUND

1. Field of Invention

This invention relates to a recreational vehicle which is comprised of two rigidly coupled sections or units.

2. Description of Prior Art

The prior art relating to this patent application can be divided into two categories. One is recreational vehicles such as motor homes or travel trailers; the other is vehicles that are rigidly coupled to the two unit. Both of these concepts will be discussed. Starting with recreational vehicles, particularly travel trailers, they are usually towed by vans, conversion vans, campers, or similar vehicles. A major disadvantage is that the passengers must exit the two vehicle to enter the recreational vehicle or vice versa. Although this may seem like only a slight inconvenience, it means that both living spaced cannot be utilized at the same time. Motor homes on the other hand do allow access to the entire living space. However, they can be cumbersome to maneuver in heavy traffic. This can be a disadvantage when the general destination of the trip has been reached and the driver and passengers would like to tour the area. Even for a short errand the passengers must accompany the driver. The second major category of prior art is to rigidly couple a trailer for the purpose of moving equipment such as luggage of motorcycles stated in U.S. Pat. Nos. 4,372,569 or 4,078,821 respectively.

OBJECTS AND ADVANTAGES

This invention relates to a recreational vehicle which is comprised of a rear section which is rigidly coupled to the front section allowing the entire unit to be utilized similar to a motor home vehicle and yet uncoupled when desired. Motor homes and travel trailers have certain advantages which are unique to each. This invention combines some of the advantages of both types of recreational vehicles. With this new design, passengers have access to the entire vehicle rather than being confined to the two vehicle. The rear section can be uncoupled from the front section. This is desirable when traveling because it can be left at a central location while the front section can be used on short day trips and then return to the base unit at night. Currently, motor homes will tow smaller vehicles to meet this same objective. Another advantage of being able to uncouple the front section is that it can be used year round as a second vehicle rather than only when traveling. In addition to saving fuel this would reduce the owner's capital investment, maintenance and insurance costs. Another advantage is that the front and rear units could be purchased and upgraded independently.

DRAWING FIGURES

FIG. 1 is a side elevation of the recreational vehicle shown with a front section which in this case is shown as a modified van but could be of any configuration.

FIG. 2 is an enlarged rear view of one of the four wheel and suspension assemblies.

FIG. 3 is an enlarged side view of one of the four wheel and suspension assemblies.

REFERENCE NUMBERS IN DRAWINGS

Figure 4:
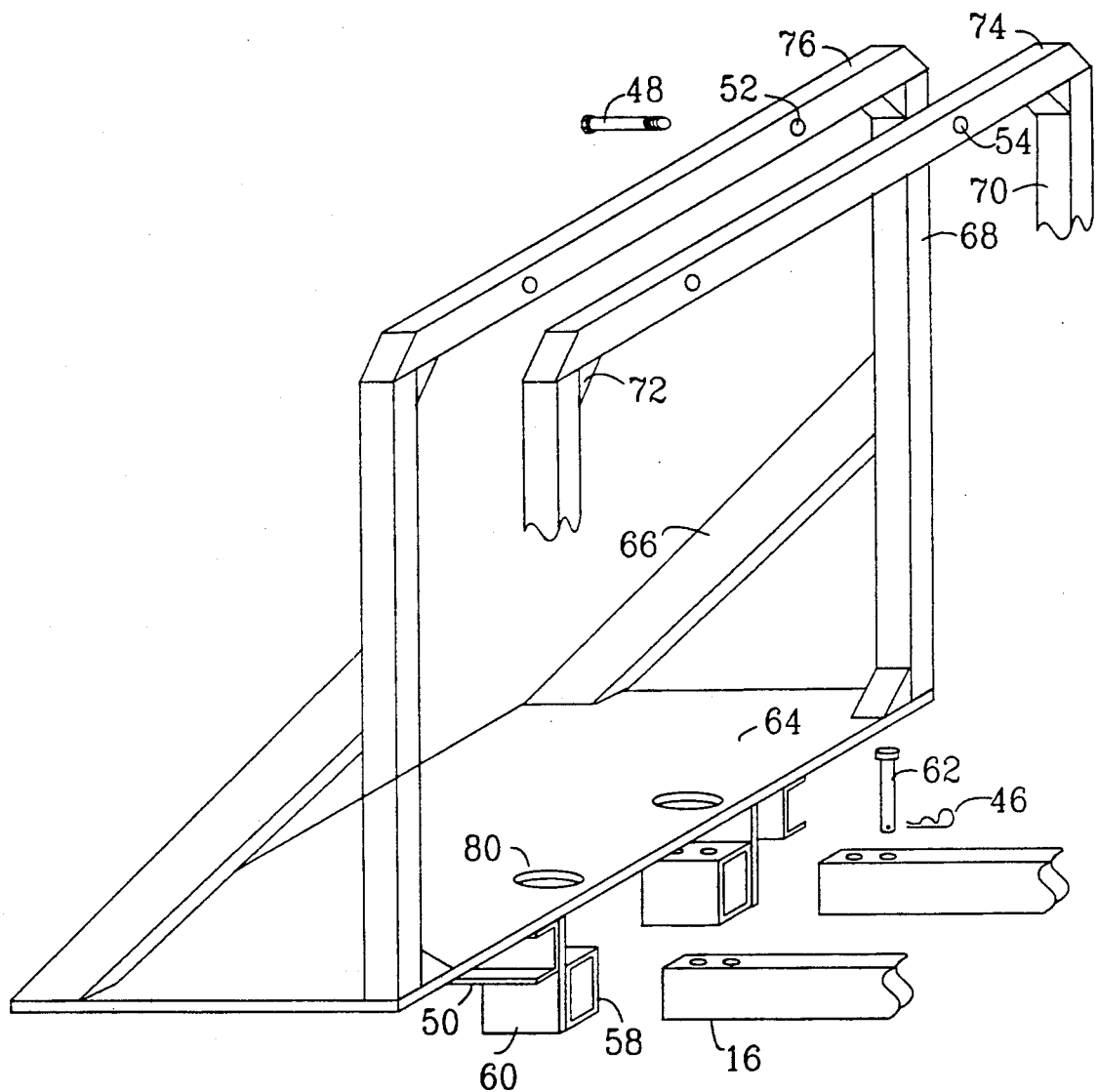
FIG. 4 is an isometric drawing of the coupling assembly used to rigidly couple the front and rear units.

| | |
|---|---|
| 10 rear section | 12 rubber boot |
| 14 front section | 16 rear section frame |
| 18 steel plate | 20 vertical strut |
| 22 horizontal swing arm | 24 gusset |
| 26 bracket | 28 pin |
| 30 spring | 32 gas filled shock absorber |
| 34 fixture | 36 pin |
| 38 bracket | 40 axle |
| 42 bolt | 44 fixture |
| 46 spring pin | 48 bolt |
| 50 front section frame | 52 hole |
| 54 hole | 56 bolt |
| 58 rectangular collar | 60 steel plate |
| 62 pin | 64 steel plate |
| 66 support brace | 68 front section column |
| 70 rear section column | 72 gusset |
| 74 horizontal beam | 76 horizontal beam |

DESCRIPTION AND OPERATION—FIGS. 1, 2 AND 3

Viewing FIG. 1 the rear unit 10 is rigidly coupled to the front unit 14. A rubber boot 12 is used as a seal when the rear unit 10 is coupled to the front unit 14. The rear unit 10 is supported by four suspension and wheel assemblies. Referring to FIG. 2 and FIG. 3 the rear and side view of one of the four identical assemblies is shown. The unit's frame 16 is a standard rectangular support beam. A rectangular piece of plate steel 18 is reinforced by six gussets 24 which are welded to pieces 16 and 18. The vehicle strut 20 pivots about a vehicle axis on the steel plate 18. The bolt 42 is used to attach the strut 20 to the steel plate 18. The bracket 26 is welded to strut 20 and is used to support the pin 28. The pin 28 supports the fixture 44 and the gas filled shock absorber 32. The fixture 44 supports the spring 30. The spring 30 is compressed between fixtures 44 and 34. The bracket 38 is used to support the pin 36. The pin 36 is used to support the fixture 34 and the gas filled shock absorber 32. The bracket 38 is welded to the horizontal swing arm 22. The swing arm 22 is pinned to the vehicle strut 20 by bolt 56.

Referring to FIG. 4 a steel plate 60 is welded to the frame 50 of the front unit 14. A rectangular collar 58 is welded to the steel plate 60. The frame 16 of the rear unit 10 will slide into the collar 58. The collar 58 and frame 16 have two holes drilled through them to accept pins 62 to hold the front and rear units rigidly. The pins 62 are held in place with spring pins 46. Steel plate 64 is bolted to the frame 50 of the front unit 14. The hole 80 in the steel plate 64 allows access to the pins 62 during coupling and uncoupling. The front section column 68 is supported by support brace 66. The horizontal beam 76 is welded to the top of the column 68. The horizontal beam 74 and the vehicle column 70 are part of the support structure of the rear unit. Bolt 48 is inserted through holes 52 and 54 to fasten the horizontal beams 74 and 76 together.

I claim:

1. A combination vehicle comprising:
    a forward towing vehicle;
    a rearward towed vehicle having suspension means comprising at least one wheel and suspension assembly suspending the towed vehicle on the wheel, wherein the suspension means is pivotally mounted on the rearward towed vehicle; and attaching means for rigidly, detachably attaching the rearward towed vehicle to the forward towing vehicle at a substantially vertical plane of attachment;

wherein the attaching means comprises collar means attached to a frame of the forward towing vehicle for internally slidingly receiving a frame of the rearward towed vehicle, first pin means for rigidly, detachably attaching the frame of the rearward towed vehicle to the collar means, a plate mounted on the frame of the forward towing vehicle, two first vertical columns mounted on the plate laterally spaced apart, a first horizontal beam interconnecting a top of each said first vertical column with each other, two second vertical columns mounted on the rearward towed vehicle laterally spaced apart, a second horizontal beam interconnecting a top of each said second vertical column with each other, and second pin means for rigidly, detachably attaching the first horizontal beam to the second horizontal beam.

* * * * *